UNITED STATES PATENT OFFICE.

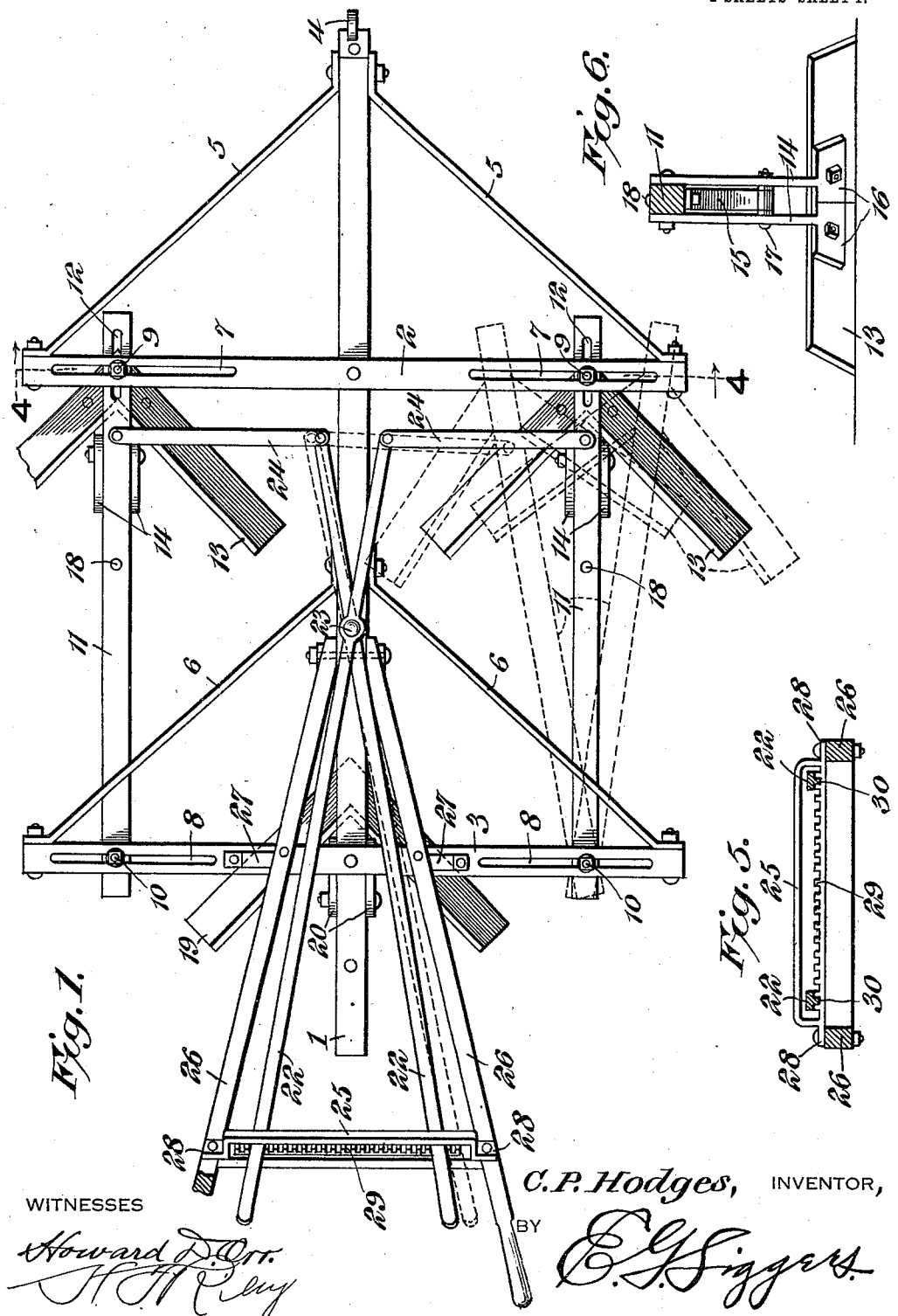

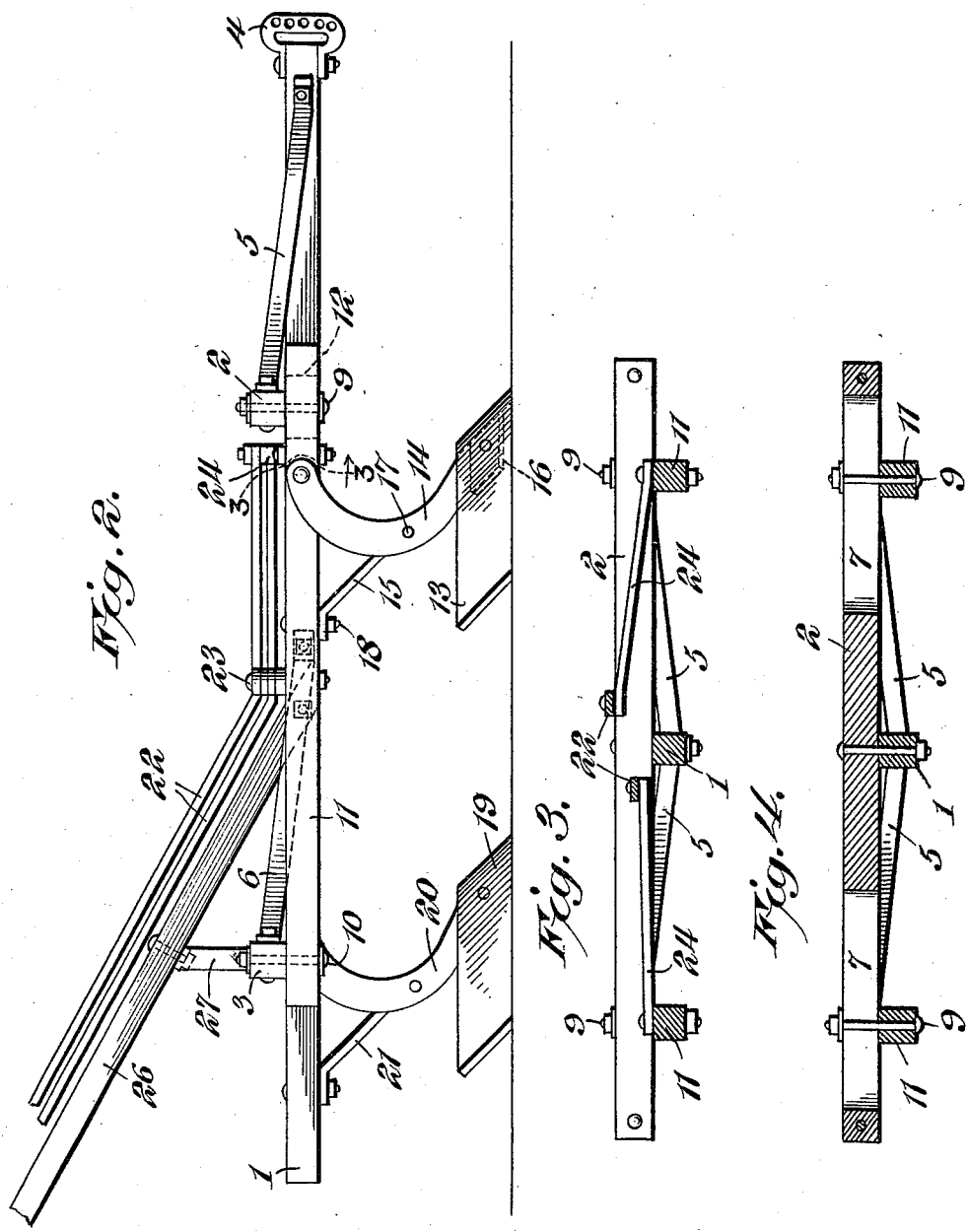

CHARLES P. HODGES, OF BROWNSVILLE, SOUTH CAROLINA.

CULTIVATOR.

1,001,955.      Specification of Letters Patent.      Patented Aug. 29, 1911.

Application filed July 19, 1910. Serial No. 572,762.

*To all whom it may concern:*

Be it known that I, CHARLES P. HODGES, a citizen of the United States, residing at Brownsville, in the county of Marlboro and State of South Carolina, have invented a new and useful Cultivator, of which the following is a specification.

The invention relates to improvements in cultivators.

The object of the present invention is to improve the construction of cultivators, and to provide a simple, inexpensive and efficient one of great strength and durability, designed particularly for cultivating cotton and corn, and capable of preliminary adjustment to arrange the cultivating devices the proper distance apart to suit the width of the rows, and of also adjusting the cultivating devices inwardly and outwardly during the operation of the cultivator to suit the unequal widths of the rows in the same field.

A further object of the invention is to provide a cultivator of this character, adapted to cut grass and weeds, thoroughly pulverize the whole bed, throw the soil toward the plants and level the ground.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a plan view of a cultivator, constructed in accordance with this invention. Fig. 2 is a side elevation of the same. Fig. 3 is a transverse sectional view on the line 3—3 of Fig. 2. Fig. 4 is a similar view on the line 4—4 of Fig. 1. Fig. 5 is a detail sectional view, illustrating the means for guiding and securing the plow controlling levers in their adjustment. Fig. 6 is a detail sectional view, illustrating the construction of the plow.

Like numerals of reference designate corresponding parts in all the figures of the drawings.

In the embodiment of the invention illustrated in the accompanying drawings, the frame of the cultivator comprises in its construction a central longitudinal beam 1, and front and rear transverse bars or beams 2 and 3, secured at their centers to the bar or beam 1 and located in advance and in rear of the center thereof. The central beam 1 is equipped at its front end with a suitable clevis 4, and the front transverse bar or beam 2 is braced by forwardly converging bars 5, secured at their outer ends to the front face of the transverse bar 2 at the ends thereof, and connected at their front ends to the central longitudinal beam 1 at opposite sides of the center thereof. The rear transverse bar or beam 3 is similarly braced by forwardly converging rods 6, extending from the ends of the transverse bars 3 to the beam 1 and secured to the said parts, as clearly shown in Fig. 1 of the drawings.

The front and rear transverse bars 2 and 3 are provided at their outer portions with slots 7 and 8, extending longitudinally of the transverse bars 2 and 3 and receiving front and rear bolts 9 and 10 of spaced plow beams 11, adjustably pivoted at their rear ends to the rear transverse bar or beam 3, and slidably connected at their front ends to the front transverse bar or beam 2. The bolts 10 constitute adjustable pivots and are movable along the slots 8 to vary the distance between the plow beams, and they pivot the latter to the rear transverse bars. The front portions of the plow beams are provided with slots 12, crossing the slots 7 and receiving the bolts 9, which form a slidable connection between the front portions of the plow beams to permit the latter to be adjusted inwardly and outwardly to suit the width of a row at any portion thereof and to enable the soil to be cultivated close to the plants without injuring the latter.

Each of the plow beams is equipped at its front portion with a sweep 13, connected with the plow beams by spaced standards 14 and braced by a rearwardly inclined bar 15. The standards 14, which are curved, as clearly shown in Fig. 2 of the drawings, are provided at their lower ends with attaching plates or flanges 16, which are bolted or otherwise secured to the inner or rear faces of the sides or wings of the sweep 13, but any other form of cultivating device may be substituted for the sweep, as will be readily understood. The upper ends of the standards 14 are bolted, or otherwise secured to the side faces of the plow beams, and the brace 15, which has its lower end arranged between the standards 14, is secured to the same at a point intermediate of the ends thereof by a transverse bolt 17, and it extends upwardly and rearwardly from the standards and is secured to the lower face of the plow beam by a vertical bolt 18, or other suitable fastening means.

The central longitudinal beam 1 is equipped with a cultivating device 19, consisting of a sweep plow located in rear of the sweep 13 and connected with the rear portion of the central longitudinal beam by curved standards 20 and an inclined brace 21, constructed and arranged similar to the standards 14 and the brace 15 heretofore described. The rear cultivating device is located centrally of the cultivator at the rear portion thereof and the adjustable cultivating devices are located at the front portion of the cultivator at opposite sides of the same, and they are adapted to cut down the grass and weeds, thoroughly pulverize the soil, throw the same toward the plants and level the ground.

The adjustable cultivating devices are movable inwardly and outwardly by means of a pair of longitudinally disposed plow controlling levers 22, mounted on a common pivot 23 and arranged at the upper face of the beam 1 through which the pivot 23 passes. The operating or controlling levers are crossed near their front portions and they have short front horizontal arms and relatively long inclined rear arms. Their front ends are connected by transverse links 24 with the plow beams 11. The rear portions of the levers 22 are arranged in a transverse guide 25, extending across the space between a pair of inclined handle bars 26 and supported by the same. The handle bars are connected at their front ends to the central beam at opposite sides thereof and are supported by short upright bars 27, mounted upon the rear transverse beam 3. The guide 25 consists of an oblong loop having terminal projecting attaching portions or lugs 28, and provided at the bottom with teeth 29, arranged at intervals and forming intervening notches to receive coacting teeth 30 of the levers 22. The operating levers are locked against lateral movement by the toothed guide, and they extend laterally beyond the latter and are located at the space between the rigid handle bars of the cultivator, and either lever is adapted to be instantly adjusted independently of the other to move either cultivating device inwardly or outwardly to suit the requirements.

Having thus fully described my invention, what I claim as new and desire to secure by Letters Patent, is:—

1. A cultivator of the class described including a frame, spaced independently adjustable plow beams located at opposite sides of the frame and provided with cultivating devices, said beams being pivoted to the cultivator frame at one end and slidably connected with the frame at the other end and arranged to swing transversely, and separate operating means mounted on the frame at a common point and movable past each other and connected with the plow beams for moving the same inwardly and outwardly.

2. A cultivator of the class described including a frame having rearwardly extending inclined handle bars, spaced independently adjustable plow beams located at opposite sides of the frame and provided with cultivating devices, said beams being adjustably pivoted to the cultivator frame at one end and slidably connected with the frame at the other end and arranged to swing transversely, and separate independently operable levers fulcrumed on the cultivator frame on a common pivot and movable past each other and connected with the plow beams for moving the same inwardly and outwardly, said levers extending rearwardly to the rear portions of the handle bars.

3. A cultivator of the class described including a frame provided with inclined handle bars, adjustable plow beams provided with cultivating devices and pivotally connected at one end with the cultivator frame and slidably connected at the other end with the same, separate operating levers fulcrumed on the cultivator frame and having a common pivot and movable past each other and consisting of horizontal front arms and inclined rear arms extending along the space between the handle bars, and means for connecting the short arms of the levers with the plow beams.

4. A cultivator of the class described including a frame provided with inclined handle bars, adjustable plow beams provided with cultivating devices and pivotally connected at one end with the cultivator frame and slidably connected at the other end with the same, separate operating levers fulcrumed on the cultivator frame and having a common pivot and movable past each other and consisting of horizontal front arms and inclined rear arms extending along the space between the handle bars, means for connecting the short arms of the levers with the plow beams, and a transverse guide carried by the handle bars and extending across the space between the same and connecting said handle bars and receiving the rear arms of the levers, said guide being provided at intervals with teeth for engaging the levers to lock the same in their adjustment.

5. A cultivator of the class described including a frame comprising a central longitudinal beam, transverse beams secured to the longitudinal beam and extending from opposite sides thereof and provided with longitudinal slots, plow beams provided at one end with slots and having front and rear fastening devices operating in the slots of the plow beams and the transverse beams, the fastening devices at one end of the plow beams forming adjustable pivots for mounting the pivoted ends of the plow beams at fixed points and the fastening devices at the other end of the plow beams slidably connecting the same with the adjacent transverse beam, and operating mechanism connected with the plow beams for moving the same inwardly and outwardly.

6. A cultivator of the class described including a frame comprising a central longitudinal beam, and front and rear transverse beams extending laterally from the longitudinal beam, a central cultivating device connected with the rear portion of the cultivator frame, plow beams located at opposite sides of the cultivator frame and pivotally connected with one of the transverse beams and slidably connected with the other and provided with cultivating devices, inclined handle bars rigidly connected with the cultivator frame, and operating levers mounted intermediate of their ends on a common pivot and arranged to swing past each other and extending along the handle bars and connected with the adjustable plow beams for moving the same inwardly and outwardly.

In testimony, that I claim the foregoing as my own, I have hereto affixed my signature in the presence of two witnesses.

CHARLES P. HODGES.

Witnesses:
T. E. McCALL,
J. M. BRUSINGTON.

---

Copies of this patent may be obtained for five cents each, by addressing the "Commissioner of Patents, Washington, D. C."